US011282522B2

(12) United States Patent
Chae et al.

(10) Patent No.: US 11,282,522 B2
(45) Date of Patent: Mar. 22, 2022

(54) ARTIFICIAL INTELLIGENCE APPARATUS AND METHOD FOR RECOGNIZING SPEECH OF USER

(71) Applicant: LG ELECTRONICS INC., Seoul (KR)

(72) Inventors: Jonghoon Chae, Seoul (KR); Dahae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 225 days.

(21) Appl. No.: 16/584,402

(22) Filed: Sep. 26, 2019

(65) Prior Publication Data
US 2020/0027459 A1    Jan. 23, 2020

(30) Foreign Application Priority Data
Sep. 9, 2019    (KR) .................. 10-2019-0111320

(51) Int. Cl.
| | | |
|---|---|---|
| *G10L 15/00* | (2013.01) | |
| *G10L 15/22* | (2006.01) | |
| *G06K 9/00* | (2022.01) | |
| *G10L 15/16* | (2006.01) | |
| *G10L 15/24* | (2013.01) | |
| *G06N 3/08* | (2006.01) | |
| *G06F 40/253* | (2020.01) | |
| *G06F 40/295* | (2020.01) | |

(52) U.S. Cl.
CPC ............ *G10L 15/22* (2013.01); *G06F 40/253* (2020.01); *G06F 40/295* (2020.01); *G06K 9/00302* (2013.01); *G06K 9/00335* (2013.01); *G06N 3/08* (2013.01); *G10L 15/16* (2013.01); *G10L 15/24* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 8,209,179 | B2* | 6/2012 | Aoyama | ............... G10L 15/22 704/257 |
| 8,321,221 | B2* | 11/2012 | Aoyama | ............... G10L 15/22 704/257 |
| 8,538,750 | B2* | 9/2013 | Aoyama | ............... G10L 15/22 704/231 |
| 9,613,618 | B2* | 4/2017 | Chakladar | ............ G10L 15/005 |
| 2004/0122673 | A1 | 6/2004 | Park et al. | |

(Continued)

FOREIGN PATENT DOCUMENTS

| | | |
|---|---|---|
| JP | 2003-208196 A | 7/2003 |
| KR | 10-2004-0050928 A | 6/2004 |

*Primary Examiner* — Satwant K Singh
(74) *Attorney, Agent, or Firm* — Birch, Stewart, Kolasch & Birch, LLP

(57) ABSTRACT

An artificial intelligence apparatus for recognizing speech of a user includes a microphone and a processor configured to acquire, via the microphone, first speech data including speech of a user, generate a first speech recognition result corresponding to the first speech data, perform control corresponding to the generated first speech recognition result, generate an alternative speech recognition result corresponding to the first speech data if negative feedback is acquired from the user, and perform control corresponding to the generated alternative speech recognition result.

11 Claims, 13 Drawing Sheets

(56) References Cited

U.S. PATENT DOCUMENTS

2014/0164476 A1* 6/2014 Thomson ............. G06Q 10/101
709/203
2016/0103833 A1* 4/2016 Sanders ................. G10L 15/22
707/723

* cited by examiner

ARTIFICIAL INTELLIGENCE APPARATUS AND METHOD FOR RECOGNIZING SPEECH OF USER

CROSS-REFERENCE TO RELATED APPLICATIONS

This application claims priority to Korean Patent Application No. 10-2019-0111320 filed on Sep. 9, 2019, in Korea, the entire contents of which is hereby incorporated by reference in its entirety.

BACKGROUND

The present disclosure relates to an artificial intelligence apparatus and method for recognizing speech of a user, and more particularly, to an artificial intelligence apparatus and method for generating an alternative recognition result without re-utterance of a user and recognizing speech of the user, upon determining that speech recognition has failed when the speech of the user is recognized.

Recently, apparatuses for receiving sound and performing control are increasing. An apparatus such as an artificial intelligence speaker or a smartphone recognizes speech uttered by a user and performs control corresponding to a recognition result or provides a response.

However, even if the speech uttered by the user is misrecognized, conventional speech recognition apparatuses do not recognize that the speech of the user is misrecognized. In addition, since the conventional artificial intelligence apparatuses perform control or provide responses based on the misrecognized result, users need to input their speech again.

SUMMARY

The present disclosure is to provide an artificial intelligence apparatus and method for providing a speech recognition result of speech uttered by a user and generating an alternative recognition result without re-utterance of the user to recognize the speech of the user when negative feedback of the user is acquired.

According to an embodiment, provided is an artificial intelligence apparatus and method for acquiring speech data including speech of a user, generating a speech recognition result corresponding to the acquired speech data, performing control corresponding to the generated speech recognition result, generating an alternative speech recognition result corresponding to the acquired speech data when negative feedback is acquired from the user, and performing control corresponding to the alternative speech recognition result.

According to an embodiment, provided is an artificial intelligence apparatus and method for determining that an existing speech recognition result is incorrect when negative feedback of a user is acquired, correcting a probability of each word when speech data is converted into text, converting speech data into text based on the corrected probability, and generating an alternative speech recognition result using the newly converted text.

BRIEF DESCRIPTION OF THE DRAWINGS

The present disclosure will become more fully understood from the detailed description given herein below and the accompanying drawings, which are given by illustration only, and thus are not limitative of the present disclosure, and wherein.

DETAILED DESCRIPTION OF THE EMBODIMENTS

Figure 1:
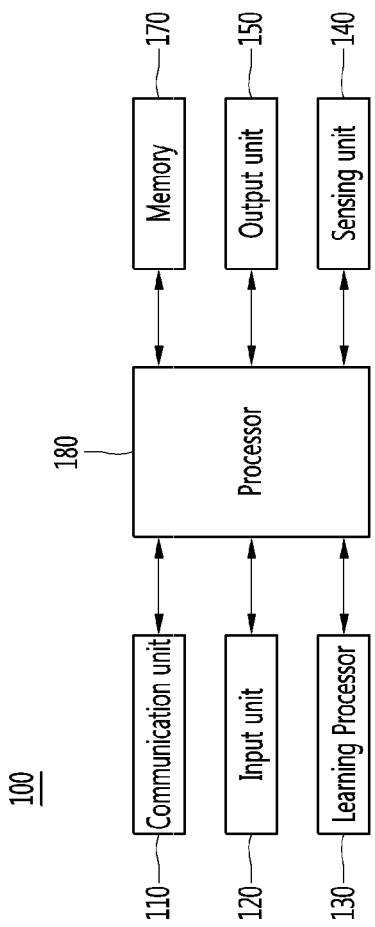
FIG. 1 is a block diagram illustrating an AI apparatus according to an embodiment.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the disclosure in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for training data is given, and the label may mean the correct answer (or result value) that the artificial neural network must infer when the training data is input to the artificial neural network. The unsupervised learning may refer to a method of learning an artificial neural network in a state in which a label for training data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

Here, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 is a block diagram illustrating an AI apparatus 100 according to an embodiment.

Hereinafter, the AI apparatus 100 may be referred to as a terminal.

The AI apparatus (or an AI device) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI apparatus 100 may include a communication unit 110, an input unit 120, a learning processor 130, a sensing unit 140, an output unit 150, a memory 170, and a processor 180.

The communication unit 110 may transmit and receive data to and from external devices such as other 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth, RFID (Radio Frequency Identification), Infrared Data Association (IrDA), ZigBee, NFC (Near Field Communication), and the like.

The input unit 120 may acquire various kinds of data.

Here, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a training data for model learning and an input data to be used when an output is acquired by using learning model. The input unit 120 may acquire raw input data. Here, the processor 180 or the learning processor 130 may extract an input feature by preprocessing the input data.

The learning processor 130 may learn a model composed of an artificial neural network by using training data. The learned artificial neural network may be referred to as a learning model. The learning model may be used to an infer result value for new input data rather than training data, and the inferred value may be used as a basis for determination to perform a certain operation.

Here, the learning processor 130 may perform AI processing together with the learning processor 240 of the AI server 200.

Here, the learning processor 130 may include a memory integrated or implemented in the AI apparatus 100. Alternatively, the learning processor 130 may be implemented by using the memory 170, an external memory directly connected to the AI apparatus 100, or a memory held in an external device.

The sensing unit 140 may acquire at least one of internal information about the AI apparatus 100, ambient environment information about the AI apparatus 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

Here, the output unit 150 may include a display unit for outputting time information, a speaker for outputting auditory information, and a haptic module for outputting haptic information.

The memory 170 may store data that supports various functions of the AI apparatus 100. For example, the memory 170 may store input data acquired by the input unit 120, training data, a learning model, a learning history, and the like.

The processor 180 may determine at least one executable operation of the AI apparatus 100 based on information determined or generated by using a data analysis algorithm or a machine learning algorithm. The processor 180 may control the components of the AI apparatus 100 to execute the determined operation.

To this end, the processor 180 may request, search, receive, or utilize data of the learning processor 130 or the memory 170. The processor 180 may control the components of the AI apparatus 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intent information for the user input and may determine the user's requirements based on the acquired intent information.

The processor 180 may acquire the intent information corresponding to the user input by using at least one of a speech to text (STT) engine for converting speech input into a text string or a natural language processing (NLP) engine for acquiring intent information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI apparatus 100 so as to drive an application program stored in memory 170. Furthermore, the processor 180 may operate two or more of the components included in the AI apparatus 100 in combination so as to drive the application program.

Figure 2:
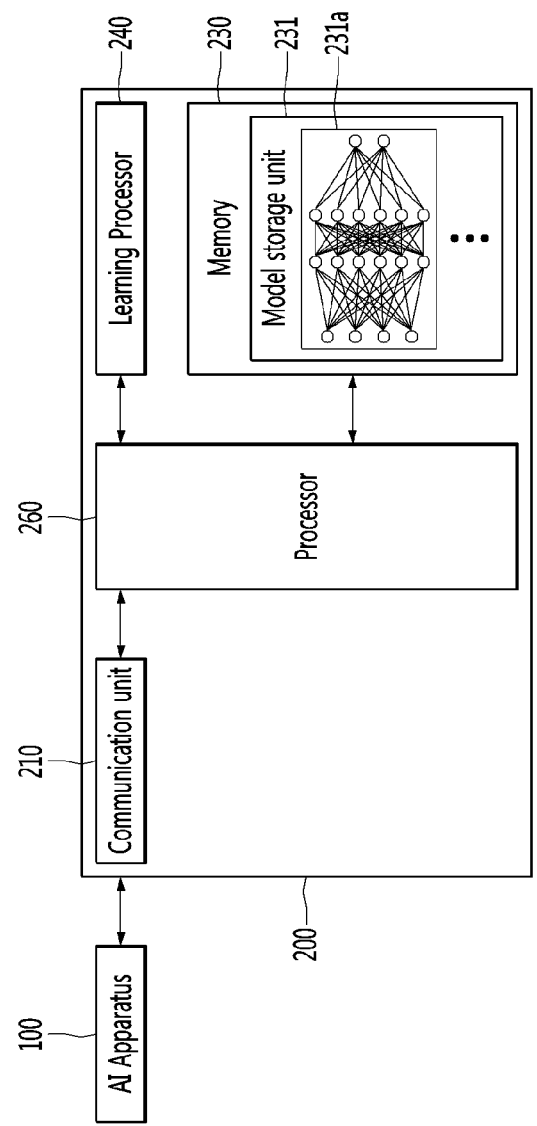
FIG. 2 is a block diagram illustrating an AI server according to an embodiment.

FIG. 2 is a block diagram illustrating an AI server 200 according to an embodiment.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. Here, the AI server 200 may be included as a partial configuration of the AI apparatus 100, and may perform at least part of the AI processing together.

The AI server 200 may include a communication unit 210, a memory 230, a learning processor 240, a processor 260, and the like.

The communication unit 210 can transmit and receive data to and from an external device such as the AI apparatus 100.

The memory 230 may include a model storage unit 231. The model storage unit 231 may store a learning or learned model (or an artificial neural network 231a) through the learning processor 240.

The learning processor 240 may learn the artificial neural network 231a by using the training data. The learning model may be used in a state of being mounted on the AI server 200 of the artificial neural network, or may be used in a state of being mounted on an external device such as the AI apparatus 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
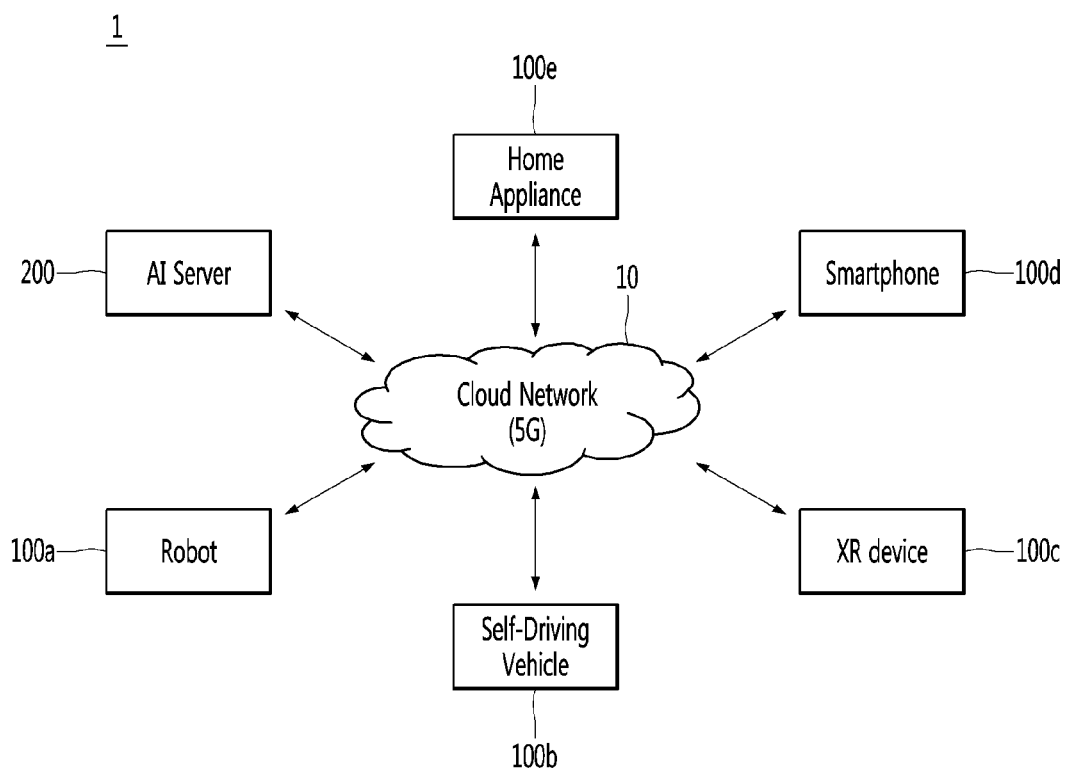
FIG. 3 is a view illustrating an AI system according to an embodiment.

FIG. 3 is a view illustrating an AI system 1 according to an embodiment.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI apparatuses 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI apparatuses constituting the AI system 1, that is, the robot 100a, the self-driving vehicle 100b, the XR device 100c, the smartphone 100d, or the home appliance 100e through the cloud network 10, and may assist at least part of AI processing of the connected AI apparatuses 100a to 100e.

Here, the AI server 200 may learn the artificial neural network according to the machine learning algorithm instead of the AI apparatuses 100a to 100e, and may directly store the learning model or transmit the learning model to the AI apparatuses 100a to 100e.

Here, the AI server 200 may receive input data from the AI apparatuses 100a to 100e, may infer the result value for the received input data by using the learning model, may generate a response or a control command based on the inferred result value, and may transmit the response or the control command to the AI apparatuses 100a to 100e.

Alternatively, the AI apparatuses 100a to 100e may infer the result value for the input data by directly using the learning model, and may generate the response or the control command based on the inference result.

Hereinafter, various embodiments of the AI apparatuses 100a to 100e to which the above-described technology is applied will be described. The AI apparatuses 100a to 100e illustrated in FIG. 3 may be regarded as a specific embodiment of the AI apparatus 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

Here, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external device to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. Here, the robot 100a may acquire the intent information of the interaction due to the user's operation or speech utterance, and may determine the response based on the acquired intent information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100*b* may recognize the environment or objects for an area covered by a field of view or an area over a certain distance by receiving the sensor information from external devices, or may receive directly recognized information from the external devices.

The self-driving vehicle 100*b* may perform the above-described operations by using the learning model composed of at least one artificial neural network. For example, the self-driving vehicle 100*b* may recognize the surrounding environment and the objects by using the learning model, and may determine the traveling route by using the recognized surrounding information or object information. The learning model may be learned directly from the self-driving vehicle 100*a* or may be learned from an external device such as the AI server 200.

Here, the self-driving vehicle 100*b* may perform the operation by generating the result by directly using the learning model, but the sensor information may be transmitted to the external device such as the AI server 200 and the generated result may be received to perform the operation.

The self-driving vehicle 100*b* may use at least one of the map data, the object information detected from the sensor information, or the object information acquired from the external device to determine the travel route and the travel plan, and may control the driving unit such that the self-driving vehicle 100*b* travels along the determined travel route and travel plan.

The map data may include object identification information about various objects arranged in the space (for example, road) in which the self-driving vehicle 100*b* travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100*b* may perform the operation or travel by controlling the driving unit based on the control/interaction of the user. Here, the self-driving vehicle 100*b* may acquire the intent information of the interaction due to the user's operation or speech utterance, and may determine the response based on the acquired intent information, and may perform the operation.

<AI+XR>

The XR device 100*c*, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100*c* may analyzes three-dimensional point cloud data or image data acquired from various sensors or the external devices, generate position data and attribute data for the three-dimensional points, acquire information about the surrounding space or the real object, and render to output the XR object to be output. For example, the XR device 100*c* may output an XR object including the additional information about the recognized object in correspondence to the recognized object.

The XR device 100*c* may perform the above-described operations by using the learning model composed of at least one artificial neural network. For example, the XR device 100*c* may recognize the real object from the three-dimensional point cloud data or the image data by using the learning model, and may provide information corresponding to the recognized real object. The learning model may be directly learned from the XR device 100*c*, or may be learned from the external device such as the AI server 200.

Here, the XR device 100*c* may perform the operation by generating the result by directly using the learning model, but the sensor information may be transmitted to the external device such as the AI server 200 and the generated result may be received to perform the operation.

<AI+Robot+Self-Driving>

The robot 100*a*, to which the AI technology and the self-driving technology are applied, may be implemented as a guide robot, a carrying robot, a cleaning robot, a wearable robot, an entertainment robot, a pet robot, an unmanned flying robot, or the like.

The robot 100*a*, to which the AI technology and the self-driving technology are applied, may refer to the robot itself having the self-driving function or the robot 100*a* interacting with the self-driving vehicle 100*b*.

The robot 100*a* having the self-driving function may collectively refer to a device that moves for itself along the given route without the user's control or moves for itself by determining the route by itself.

The robot 100*a* and the self-driving vehicle 100*b* having the self-driving function may use a common sensing method so as to determine at least one of the travel route or the travel plan. For example, the robot 100*a* and the self-driving vehicle 100*b* having the self-driving function may determine at least one of the travel route or the travel plan by using the information sensed through the lidar, the radar, and the camera.

The robot 100*a* that interacts with the self-driving vehicle 100*b* exists separately from the self-driving vehicle 100*b* and may perform operations interworking with the self-driving function of the self-driving vehicle 100*b* or interworking with the user who rides on the self-driving vehicle 100*b*.

Here, the robot 100*a* interacting with the self-driving vehicle 100*b* may control or assist the self-driving function of the self-driving vehicle 100*b* by acquiring sensor information on behalf of the self-driving vehicle 100*b* and providing the sensor information to the self-driving vehicle 100*b*, or by acquiring sensor information, generating environment information or object information, and providing the information to the self-driving vehicle 100*b*.

Alternatively, the robot 100*a* interacting with the self-driving vehicle 100*b* may monitor the user boarding the self-driving vehicle 100*b*, or may control the function of the self-driving vehicle 100*b* through the interaction with the user. For example, when it is determined that the driver is in a drowsy state, the robot 100*a* may activate the self-driving function of the self-driving vehicle 100*b* or assist the control of the driving unit of the self-driving vehicle 100*b*. The function of the self-driving vehicle 100*b* controlled by the robot 100*a* may include not only the self-driving function but also the function provided by the navigation system or the audio system provided in the self-driving vehicle 100*b*.

Alternatively, the robot 100*a* that interacts with the self-driving vehicle 100*b* may provide information or assist the function to the self-driving vehicle 100*b* outside the self-driving vehicle 100*b*. For example, the robot 100*a* may provide traffic information including signal information and the like, such as a smart signal, to the self-driving vehicle 100*b*, and automatically connect an electric charger to a charging port by interacting with the self-driving vehicle 100*b* like an automatic electric charger of an electric vehicle.

<AI+Robot+XR>

The robot 100*a*, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

Here, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
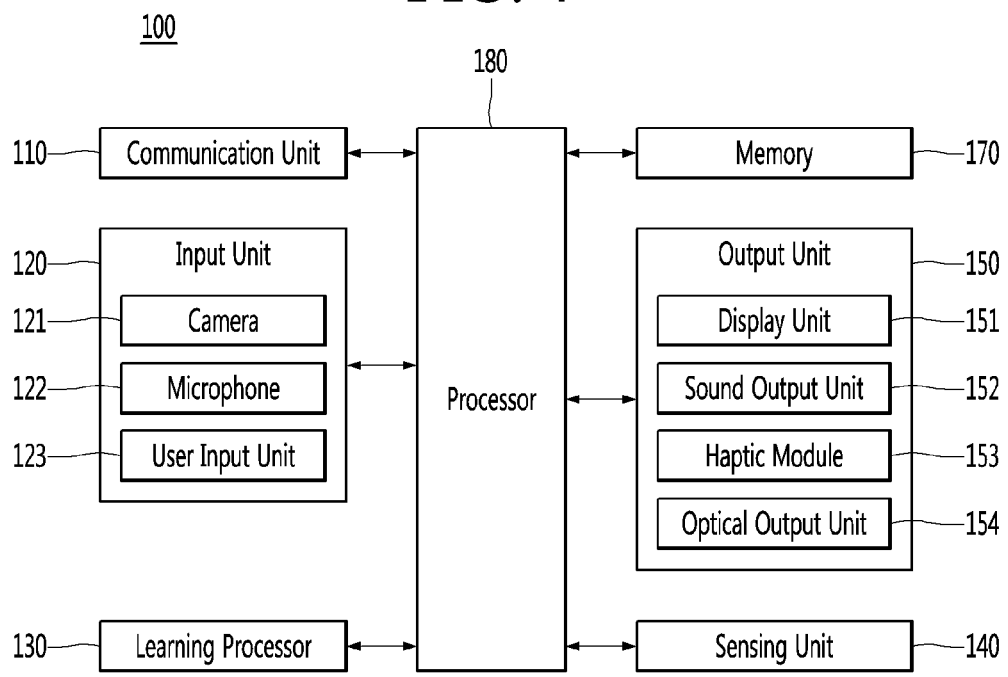
FIG. 4 is a block diagram illustrating an AI apparatus according to an embodiment.

FIG. 4 is a block diagram illustrating an AI apparatus 100 according to an embodiment.

The redundant repeat of FIG. 1 will be omitted below.

Referring to FIG. 4, the input unit 120 may include a camera 121 for image signal input, a microphone 122 for receiving audio signal input, and a user input unit 123 for receiving information from a user.

Voice data or image data collected by the input unit 120 are analyzed and processed as a user's control command.

Then, the input unit 120 is used for inputting image information (or signal), audio information (or signal), data, or information inputted from a user and the AI apparatus 100 may include at least one camera 121 in order for inputting image information.

The camera 121 processes image frames such as a still image or a video obtained by an image sensor in a video call mode or a capturing mode. The processed image frame may be displayed on the display unit 151 or stored in the memory 170.

The microphone 122 processes external sound signals as electrical voice data. The processed voice data may be utilized variously according to a function (or an application program being executed) being performed in the AI apparatus 100. Moreover, various noise canceling algorithms for removing noise occurring during the reception of external sound signals may be implemented in the microphone 122.

The user input unit 123 is to receive information from a user and when information is inputted through the user input unit 123, the processor 180 may control an operation of the AI apparatus 100 to correspond to the inputted information.

The user input unit 123 may include a mechanical input means (or a mechanical key, for example, a button, a dome switch, a jog wheel, and a jog switch at the front, back or side of the AI apparatus 100) and a touch type input means. As one example, a touch type input means may include a virtual key, a soft key, or a visual key, which is displayed on a touch screen through software processing or may include a touch key disposed at a portion other than the touch screen.

The sensing unit 140 may also be referred to as a sensor unit.

The output unit 150 may include at least one of a display unit 151, a sound output module 152, a haptic module 153, or an optical output module 154.

The display unit 151 may display (output) information processed in the AI apparatus 100. For example, the display unit 151 may display execution screen information of an application program running on the AI apparatus 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the AI apparatus 100 and a user, and an output interface between the AI apparatus 100 and a user at the same time.

The sound output module 152 may output audio data received from the wireless communication unit 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the AI apparatus 100. An example of an event occurring in the AI apparatus 100 includes message reception, call signal reception, missed calls, alarm, schedule notification, e-mail reception, and information reception through an application.

Figure 5:
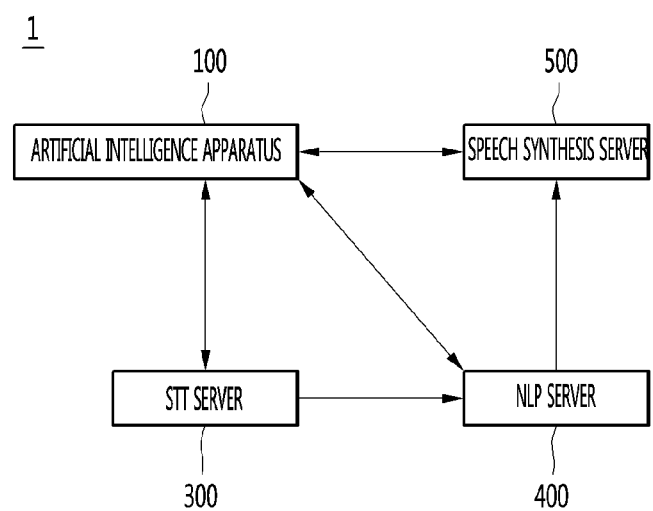
FIG. 5 is a block diagram illustrating an AI system according to an embodiment.

FIG. 5 is a block diagram illustrating an AI system 1 according to an embodiment.

Referring to FIG. 5, the AI system 1 may include an AI apparatus 100, a speech-to-text (STT) server 300, a natural language processing (NLP) server 400 and a speech synthesis server 500.

The AI apparatus 100 may transmit speech data to the STT server 300. The STT server 300 may convert the speech data received from the AI apparatus 100 into text data. The NLP server 400 may receive text data from the STT server 300. The NLP server 400 may analyze the intent of the text data based on the received text data. The NLP server 400 may transmit intent analysis information indicating the result of analyzing the intent to the AI apparatus 100 or the speech synthesis server 500. The speech synthesis server 500 may generate a synthesis speech reflecting the intent of the user based on the intent analysis information and transmit the generated synthesis speech to the AI apparatus 100.

The STT server 300 may increase accuracy of speech-to-text conversion using a language model. The language model may mean a model capable of calculating a probability of a sentence or calculating a probability of outputting a next word when previous words are given. For example, the language model may include probabilistic language models such as a unigram model, a bigram model and an N-gram model. The unigram is a model that assumes that all words are completely independent of each other and calculates a probability of a word sequence as a product of probabilities of words. The bigram model is a model that assumes that use of a word depends on only one previous word. The N-gram model is a model that assume that use of a word depends on previous (n−1) words.

That is, the STT server 300 may determine whether the converted text data is appropriately converted from the speech data using a language model, thereby increasing accuracy of conversion from the speech data into the text data.

The NLP server 400 may sequentially perform a morpheme analysis step, a syntax analysis step, a speech-act analysis step, an interaction processing step with respect to text data, thereby generating intent analysis information.

The morpheme analysis step refers to a step of classifying the text data corresponding to the speech uttered by the user into morphemes as a smallest unit having a meaning and determining the part of speech of each of the classified morphemes. The syntax analysis step refers to a step of classifying the text data into a noun phrase, a verb phrase, an adjective phrase, etc. using the result of the morpheme analysis step and determining a relation between the classified phrases. Through the syntax analysis step, the subject, object and modifier of the speech uttered by the user may be determined. The speech-act analysis step refers to a step of analyzing the intent of the speech uttered by the user using the result of the syntax analysis step. Specifically, the speech-act step refers to a step of determining the intent of a sentence such as whether the user asks a question, makes a request, or expresses simple emotion. The interaction processing step refers to a step of determining whether to answer the user's utterance, respond to the user's utterance or question about more information, using the result of the speech-act step.

The NLP server 400 may generate intent analysis information including at least one of the answer to, a response to, or a question about more information on the intent of the user's utterance, after the interaction processing step.

Meanwhile, the NLP server 400 may receive the text data from the AI apparatus 100. For example, when the AI apparatus 100 supports the speech-to-text conversion function, the AI apparatus 100 may convert the speech data into the text data and transmit the converted text data to the NLP server 400.

The speech synthesis server 500 may synthesize prestored speech data to generate a synthesized speech. The speech synthesis server 500 may record the speech of the user selected as a model and divide the recorded speech into syllables or words. The speech synthesis server 500 may store the divided speech in an internal or external database in syllable or word units.

The speech synthesis server 500 may retrieve syllables or words corresponding to the given text data from the database and synthesize the retrieved syllables or words, thereby generating the synthesized speech.

The speech synthesis server 500 may store a plurality of speech language groups respectively corresponding to a plurality of languages. For example, the speech synthesis server 500 may include a first speech language group recorded in Korean and a second speech language group recorded in English.

The speech synthesis server 500 may translate text data of a first language into text of a second language and generate a synthesized speech corresponding to the translated text of the second language using the second speech language group.

The AI system 1 may further include an AI server 200. The AI server 200 may learn at least one of an STT engine used in the STT server 300, an NLP engine used in the NLP server 400 or a speech synthesis engine used in the speech synthesis server 500. That is, at least one of the STT server 300, the NLP server 400 or the speech synthesis server 500 may use models or engines trained in the AI server 200.

Although the AI apparatus 100, the STT server 300, the NLP server 400 and the speech synthesis server 500 are shown as being divided in FIG. 5, the present disclosure is not limited thereto. In one embodiment, some of the AI server 200, the STT server 300, the NLP server 400 or the speech synthesis server 500 may be configured as one server. In one embodiment, some of the STT server 300, the NLP server 400 or the speech synthesis server 500 may be included in the AI apparatus 100. This means that the AI apparatus 100 performs the function of the STT server 300, the NLP server 400 or the speech synthesis server 500.

Figure 6:
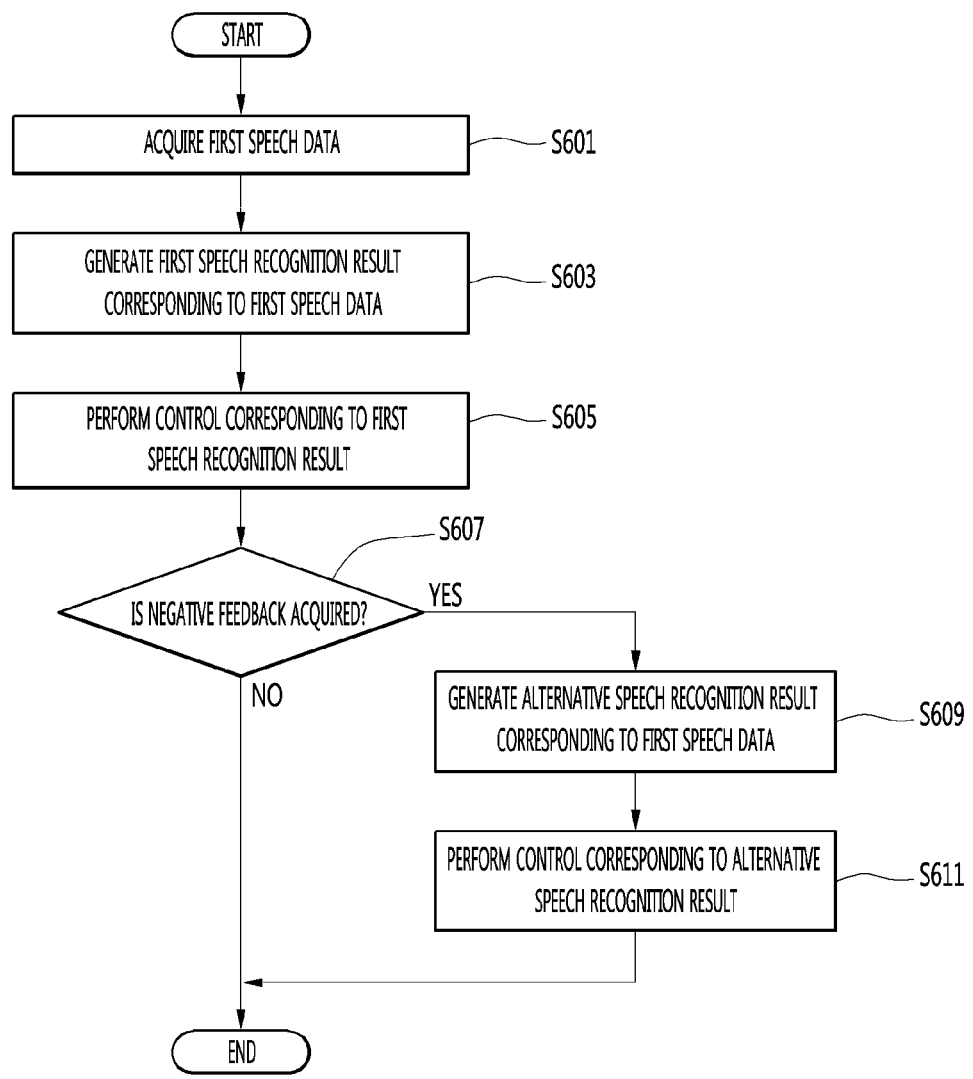
FIG. 6 is a flowchart illustrating a method of recognizing speech of a user according to an embodiment.

FIG. 6 is a flowchart illustrating a method of recognizing speech of a user according to an embodiment.

Referring to FIG. 6, the processor 180 of the AI apparatus 100 acquires first speech data including the speech of the user (S601).

The processor 180 may receive the first speech data via the microphone 122 or may receive the first speech data from an external device (not shown) via the communication unit 110.

The first speech data is obtained by converting a sound wave including the speech of the user into a digital signal. For example, the first speech data may be an audio file in various formats such as PCM (pulse code modulation), wav, mp3, or the like.

The speech of the user may refer to an uttered speech including a command for controlling the AI apparatus 100, a query for searching for information, etc.

The processor 180 may remove noise from the acquired first speech data as pre-processing. The processor 180 may directly generate speech data by removing noise using a noise removal engine or a noise removal filter or may transmit sound signal to the AI server 200 and receive speech data, from which noise is removed. In addition, the volume of the speech data may be controlled according to a predetermined level. Control of the volume of the speech data may be regarded as a portion of pre-processing. Hereinafter, the first speech data may mean the first speech data, from which noise is removed via pre-processing.

In addition, the processor 180 of the AI apparatus 100 generates a first speech recognition result corresponding to the first speech data (S603).

The first speech recognition result means a speech recognition result corresponding to the first speech data. The speech recognition result of the speech data may include text converted from the speech included in the speech data and meaning information or intent information corresponding to the converted text.

The processor 180 may convert the first speech data into text using the STT engine, generate intent information corresponding to the converted text using the NLP engine, and generate the first speech recognition result corresponding to the generated intent information. When the first speech data is converted into text, the processor 180 may calculate a word-by-word probability (or a word-by-word reliability) corresponding to each section, convert the first speech data into text based on the calculated probability, and generate the first speech recognition result based on the converted text. In particular, the processor 180 may combine words having highest probability to convert the first speech data into text.

Alternatively, the processor 180 may generate the first speech recognition result corresponding to the first speech data using the STT server 300 and the NLP server 400. For example, the processor 180 may transmit the first speech data to the STT server 300 via the communication unit 110, the STT server 300 may convert the received first speech data into text, transmit the converted text to the NLP server 400, and the NLP server 400 may generate intent information corresponding to the received text, generate the first speech recognition result corresponding to the generated intent information, and transmit the generated first speech recognition result to the AI apparatus 100.

In addition, the processor 180 of the AI apparatus 100 performs control corresponding to the generated first speech recognition result (S605).

When the first speech recognition result is a control command for controlling the AI apparatus 100 or the external device (not shown), the processor 180 may perform control corresponding to the control command. In particular, when the control command is a command for controlling the external device (not shown), the processor 180 may generate a control signal for controlling the external device (not shown) according to the control command and transmit the generated control signal to the external device (not shown) via the communication unit 110. In addition, the processor 180 may output feedback on the control command to the user via the output unit 150 or output an output signal for outputting feedback on the control command to a user terminal (not shown) via the communication unit 110.

Similarly, when the first speech recognition result is a query for requesting information, the processor 180 generates response information corresponding to the query through the Internet. In addition, the processor 180 may output the generated response information via the output unit 150 or an output signal for outputting the response information to the user terminal (not shown) via the communication unit 110.

The processor 180 may generate a response speech for outputting the response information and audibly output the response speech via the sound output unit 152. Specifically, the processor 180 may generate a response sentence using a natural language generation (NLG) scheme, convert the generated response sentence into response speech using a text-to-speech (TTS) engine, and audibly output the converted response speech via the sound output unit 152.

In addition, the processor 180 of the AI apparatus 100 determines whether negative feedback has been acquired (S607).

The negative feedback means negative evaluation of or negative response to the control performed by the AI apparatus 100 based on the first speech data. The negative feedback may include negative utterance of the user or negative expression or gesture of the user. For example, the negative feedback may include direct negative evaluation of control of the AI apparatus 100, such as "No", "Wrong' or "Recognition is wrong", asking again such as "What?", the frowning expression of the user, and hand waving of the user.

In one embodiment, the processor 180 of the AI apparatus 100 may determine whether the negative feedback has been acquired only when reliability of the first speech recognition result is less than a predetermined reference value.

Upon determining that negative feedback has been acquired in step S607, the processor 180 of the AI apparatus 100 generates an alternative speech recognition result corresponding to the first speech data (S609).

The negative feedback means negative feedback on the first speech recognition result and may mean that the first speech recognition result is inaccurate. Accordingly, when the negative feedback has been acquired from the user, the processor 180 may generate an alternative speech recognition result corresponding to the first speech data. The alternative speech recognition result may be generated from the first speech data, and may be generated differently from the first speech recognition result.

In one embodiment, the processor 180 may generate a recognition result having second highest reliability as the alternative speech recognition result, when the speech recognition result is generated from the first speech data.

In one embodiment, the processor 180 may correct a word-by-word probability corresponding to each section, convert the first speech data into text based on the corrected probability, and generate the alternative speech recognition result based on the newly converted text, when the first speech data is converted into text. This will be described in detail with reference to FIGS. 10 and 11.

In addition, the processor 180 of the AI apparatus 100 performs control corresponding to the generated alternative speech recognition result (S611).

When the negative feedback has not been acquired in step S607, the processor 180 of the AI apparatus 100 finishes the procedure. Finishing the procedure means that interaction with the first speech data is finished to proceed to next interaction.

The steps shown in FIG. 6 may be repeatedly performed. Therefore, the AI apparatus 100 may repeatedly interact with the user via speech recognition.

Figure 7:
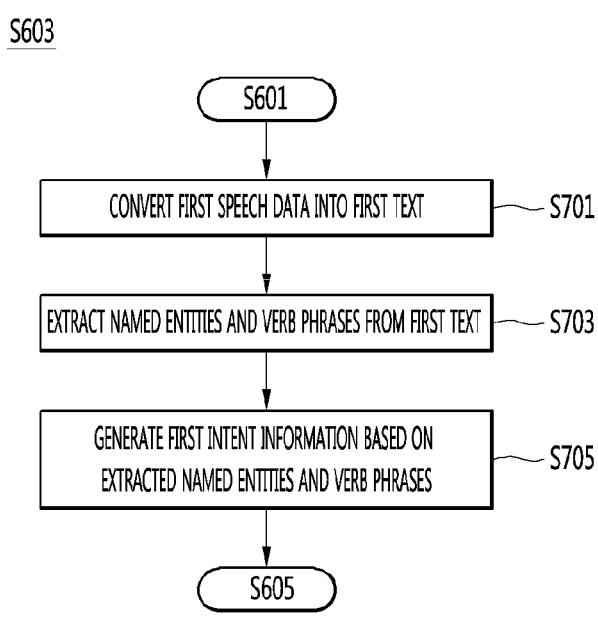
FIG. 7 is a flowchart illustrating an example of step S603 of generating a first speech recognition result shown in FIG. 6.

FIG. 7 is a flowchart illustrating an example of step S603 of generating a first speech recognition result shown in FIG. 6.

Referring to FIG. 7, the processor 180 of the AI apparatus 100 converts the first speech data into first text (S701).

The processor 180 may convert speech included in the first speech data into the first text using an acoustic model (AM) and a language model (LM).

The processor 180 may calculate word-by-word reliability corresponding to each section from the first speech data and select or combine words having highest reliability, converting the first speech data into the first text. That is, the converted first text may be regarded as a result of combining words having highest reliability in the AM and the LM.

In addition, the processor 180 of the AI apparatus 100 extracts named entities and verb phrases from the first text (S703).

The named entity may mean a noun having a certain meaning among the words included in the first text and plays an important role in grasping the meaning or intent of the first text. Similarly, the verb phrase plays an important role in grasping the meaning or intent of the first text.

In addition, the processor 180 of the AI apparatus 100 generates first intent information based on the extracted named entities and the verb phrases (S705).

The first speech recognition result may include the generated first intent information. That is, generating the first intent information may mean that the first speech recognition result corresponding to the first speech data is generated.

Figure 8:
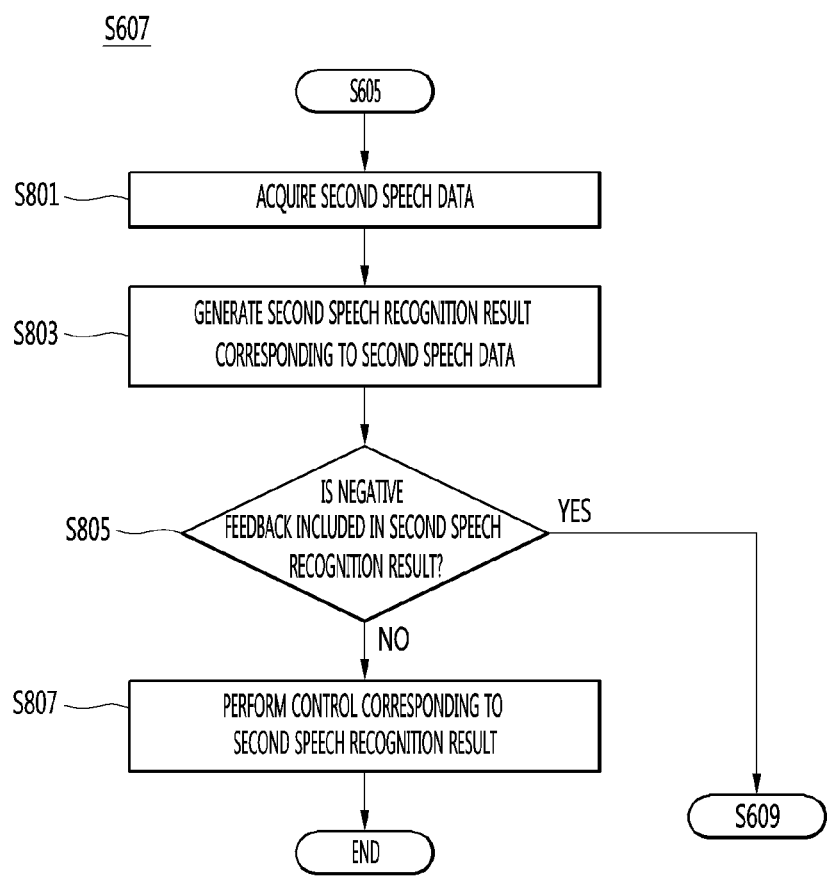
FIG. 8 is a flowchart illustrating an example of step S607 of determining whether negative feedback has been acquired shown in FIG. 6.

FIG. 8 is a flowchart illustrating an example of step S607 of determining whether the negative feedback has been acquired shown in FIG. 6.

Specifically, FIG. 8 shows an embodiment of determining whether the negative feedback is included in newly acquired speech data.

Referring to FIG. 8, the processor 180 of the AI apparatus 100 acquires second speech data including the speech of the user (S801).

The second speech data may mean speech data acquired after the first speech data has been acquired.

The processor 180 may acquire the second speech data via the microphone 122, and receive the second speech data from the external device (not shown) via the communication unit 110.

The processor 180 may remove noise from the acquired second speech data as pre-processing. Hereinafter, the second speech data may mean second speech data, from which noise is removed, via pre-processing.

In addition, the processor 180 of the AI apparatus 100 generates a second speech recognition result corresponding to the second speech data (S803).

The second speech recognition result means a speech recognition result corresponding to the second speech data.

In addition, the processor 180 of the AI apparatus 100 determines whether negative feedback is included in the second speech recognition result (S805).

As described above, the second speech data includes a speech uttered after the first speech data has been acquired (or an utterance time point).

The negative feedback includes negative evaluation of or negative reaction to control performed by the AI apparatus 100. For example, negative feedback may include direct negative evaluation of control of the AI apparatus 100, such as "No", "Wrong" or "Recognition is wrong", or negative reaction such as asking again like "What?" or sighing.

When the negative feedback is not included in the second speech recognition result as the result of determination step S805, the processor 180 of the AI apparatus 100 performs control corresponding to the second speech recognition result (S807).

The negative feedback being not included in the second speech recognition result may mean that the second speech data includes speech for new query or control, instead of feedback on the first speech recognition result. Accordingly, the processor 180 may perform control corresponding to the second speech recognition result.

In one embodiment, the processor 180 may finish operation without performing control corresponding to the second speech recognition result, when the negative feedback is not included in the second speech recognition result.

When the negative feedback is included in the second speech recognition result as the result of determination step S805, the processor 180 of the AI apparatus 100 performs a step S609 of generating an alternative speech recognition result corresponding to the first speech data.

Figure 9:
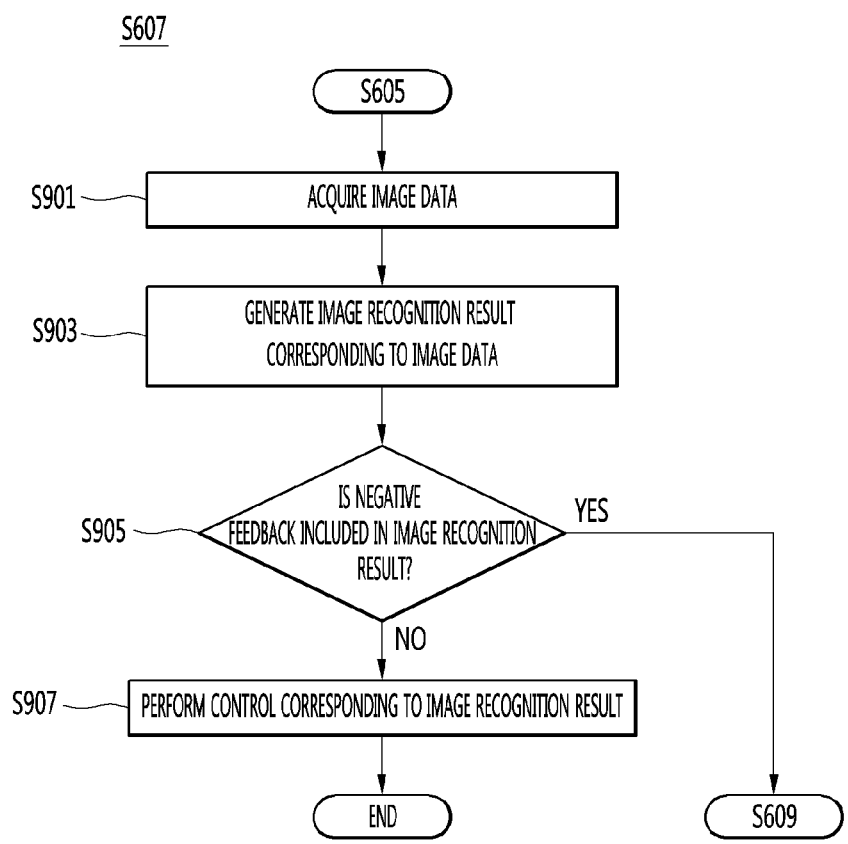
FIG. 9 is a flowchart illustrating an example of step S607 of determining whether negative feedback has been acquired shown in FIG. 6.

FIG. 9 is a flowchart illustrating an example of step S607 of determining whether the negative feedback has been acquired shown in FIG. 6.

Specifically, FIG. 9 shows an embodiment of determining whether the negative feedback is included in newly acquired image data.

Referring to FIG. 9, the processor 180 of the AI apparatus 100 acquires image data including the body of the user (S901).

The processor 180 may acquire the image data via the camera 121 and receive the image data from the external device (not shown) via the communication unit 110.

In addition, the processor 180 of the AI apparatus 100 generates an image recognition result corresponding to the image data (S903).

The image recognition result may include at least one of an expression recognition result or a gesture recognition result. The processor 180 may generate the expression recognition result using an expression recognition model and generate the gesture recognition result using a gesture recognition model.

At least one of the expression recognition model or the gesture recognition model may include an artificial neural network and may be learned by using a machine learning algorithm or a deep learning algorithm. For example, the expression recognition model or the gesture recognition model includes a convolution neural network (CNN) and may be learned to output information on the user's expression or user's gesture included in the image data when the image data is input.

In addition, the processor 180 of the AI apparatus 100 determines whether the negative feedback is included in the image recognition model (S905).

The negative feedback includes negative evaluation of or negative reaction to control performed by the AI apparatus 100. For example, the negative feedback may include a user's frowning expression, a user's hand waving gesture, etc.

When the negative feedback is not included in the image recognition result as the result of determination step S905, the processor 180 of the AI apparatus 100 performs control corresponding to the image recognition result (S907).

The negative feedback being not included in the image recognition result may mean that the image data includes operation for new query or control, instead of feedback on the first speech recognition result. Accordingly, the processor 180 may perform control corresponding to the image recognition result.

In one embodiment, the processor 180 may finish operation without performing control corresponding to the image recognition result, when the negative feedback is not included in the image recognition result.

When negative feedback is included in the image recognition result as the result of determination step S905, the processor 180 of the AI apparatus 100 performs a step S609 of generating an alternative speech recognition result corresponding to the first speech data.

Figure 10:
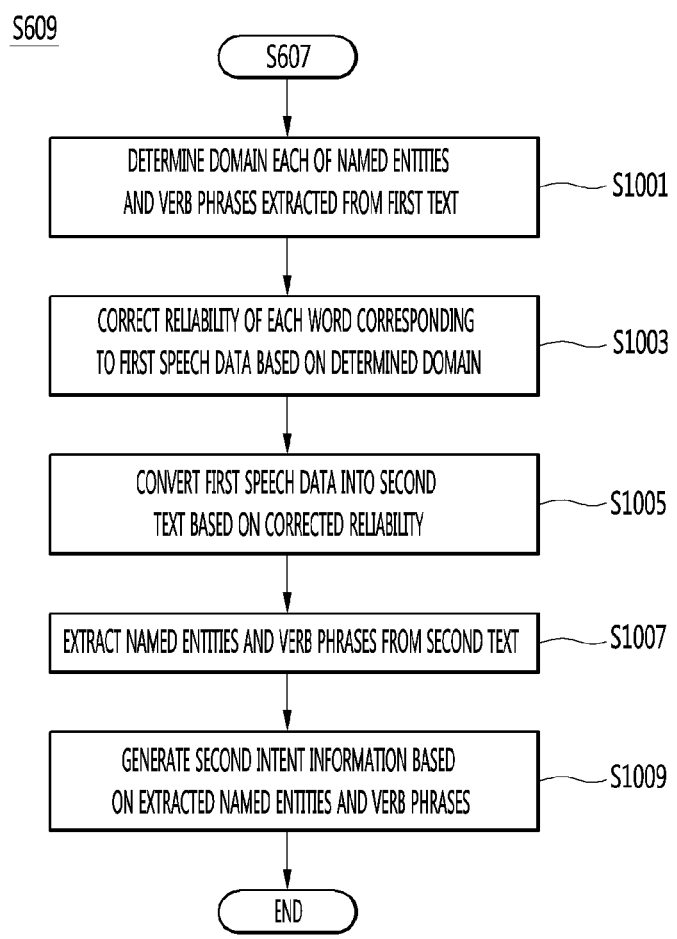
FIG. 10 is a flowchart illustrating an example of step S609 of generating an alternative speech recognition result shown in FIG. 6.

FIG. 10 is a flowchart illustrating an example of step S609 of generating the alternative speech recognition result shown in FIG. 6.

Referring to FIG. 10, the processor 180 of the AI apparatus 100 determines respective domains of the named entities and the verb phrases extracted from the first text (S1001).

In addition, the processor 180 of the AI apparatus 100 corrects reliability of each word corresponding to the first speech data based on the determined domains (S1003).

The processor 180 may determine a dominant domain among the domains determined with respect to the extracted named entities and the extracted verb phrases, calculate a distance between each of the determined domains and the dominant domain, and correct reliability of each of the words included in each of the determined domains based on the distance between each of the determined domains and the dominant domain. The processor 180 may determine that the reliability of each of the words included in the domain decreases as the distance from the dominant domain increases.

The processor 180 may determine, as a dominant domain, a domain, the number of which is largest, among the domains determined with respect to the extracted named entities and the extracted verb phrases. For example, when three named entities and two verb phrases are extracted and the determined domains thereof are "weather", "weather", "movie", "weather" and "weather", since the number of the domains "weather" is largest, the processor 180 may determine "weather" as the dominant domain.

The processor 180 may determine the distance between the domains based on a distance between the words included in each domain in a vector space when the words are converted into a vector according to a word embedding scheme. For example, the processor 180 may determine an average of distances between first words included in a first domain and second words included in a second domain in the vector space as a distance between the first domain and the second domain.

The processor 180 may determine a weight with respect to each domain and correct word-by-word reliability by multiplying the determined weight by an existing word-by-word reliability. The processor 180 may determine that a weight decreases as the distance from the dominant domain increases. Accordingly, the processor 180 may set the weight of the dominant domain to a highest value.

In addition, the processor 180 of the AI apparatus 100 converts the first speech data into second text based on the corrected reliability (S1005).

The processor 180 may convert the first speech data into the second text, by combining words having highest reliability using the reliability corrected for each word. As the word-by-word reliability is corrected, words having highest reliability may be changed and thus the first text and the second text may not be the same.

In addition, the processor 180 of the AI apparatus 100 extracts named entities and verb phrases from the second text (S1007).

The named entity may mean a noun having a certain meaning among the words included in the second text and plays an important role in grasping the meaning or intent of the second text. Similarly, the verb phrase plays an important role in grasping the meaning or intent of the second text.

In addition, the processor 180 of the AI apparatus 100 generates second intent information based on the extracted named entities and the verb phrases (S1009).

The alternative speech recognition result may include the generated second intent information. That is, generating the second intent information may mean that the alternative speech recognition result corresponding to the first speech data is generated.

Figure 11:
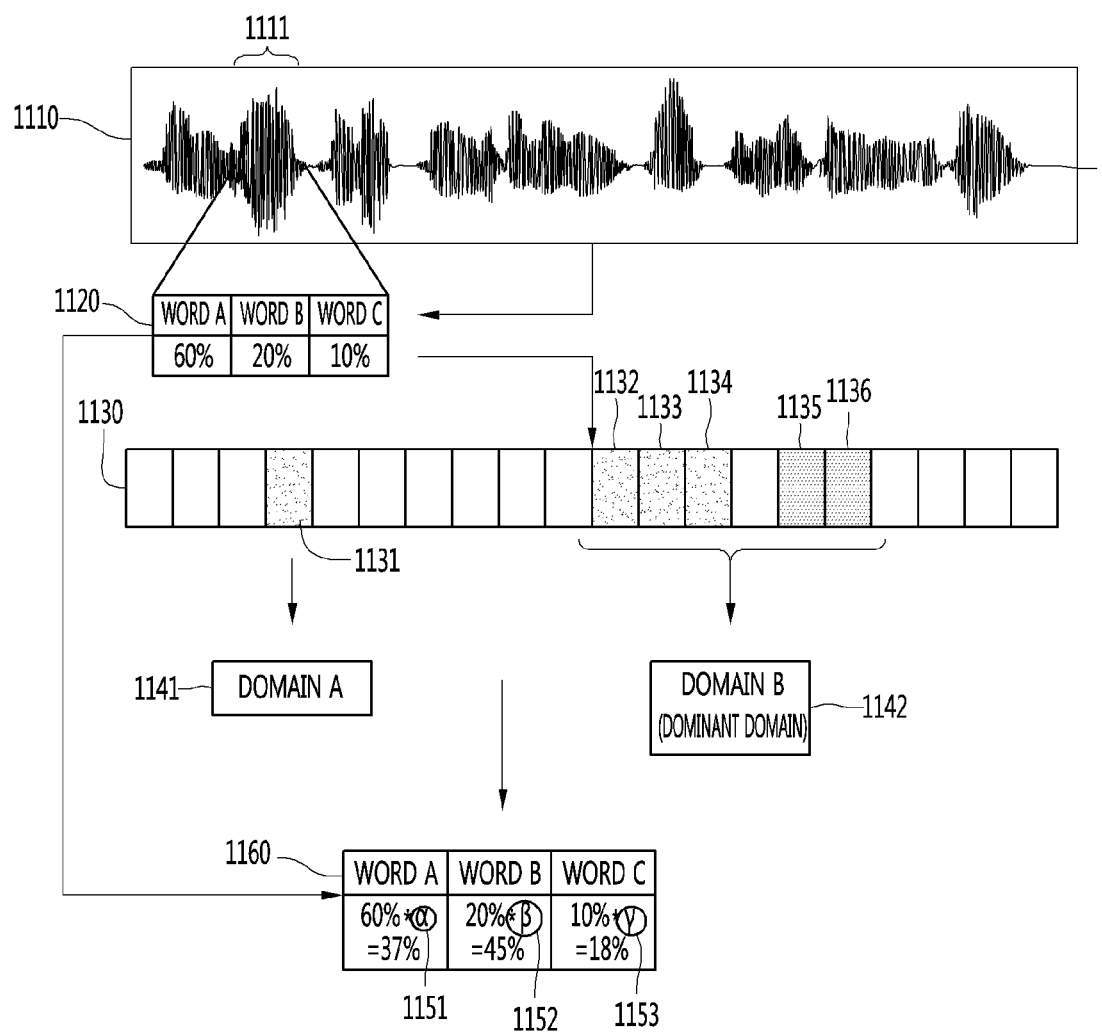
FIG. 11 is a view illustrating a method of generating an alternative speech recognition result according to an embodiment.

FIG. 11 is a view illustrating a method of generating an alternative speech recognition result according to an embodiment.

Referring to FIG. 11, when the speech data 1110 including the speech of the user is acquired, the processor 180 may calculate reliability or a probability 1120 for each word included in the speech data 1110 and determine a word having highest reliability as a word corresponding to the speech included in the speech data 1110. For example, the processor 180 may determine that a probability that the speech of a specific section 1111 is a word A is 60%, a probability that the speech of a specific section 1111 is a word B is 20%, a probability that the speech of a specific section 1111 is a word C is 10%, and determine the word A as the word of the section 1111 based on the determined word-by-word probability 1120.

In addition, the processor 180 may convert the speech data 1110 into text 1130 based on the calculated probability 1120. Although the text 1130 shown in FIG. 11 does not show characters, each cell may mean a morpheme or a word.

In addition, the processor 180 may extract named entities 1131, 1132, 1133 and 1134 and verb phrases 1135 and 1136 from the converted text 1130 and determine a domain of each of the extracted named entities 1131, 1132, 1133 and 1134 and verb phrases 1135 and 1136. For example, the processor 180 may determine the domain of the first named entity 1131 as a domain A 1141 and determine the domain of the second to fourth named entities 1132, 1133 and 1134 and the first and second verb phrases 1135 and 1136 as a domain B 1142. In this case, since the number of named entities and verb phrases belonging to the domain B 1142 is greater than the number of named entities and verb phrases belonging to the other domain 1141, the processor 180 may determine the domain B 1142 as a dominant domain.

In addition, the processor 180 may determine weights 1151, 1152 and 1153 of the domains based on how far the domain, to which each word belongs, is from the dominant domain 1142. For example, the processor 180 may determine that the weight a 1151 of the domain, to which the word A belongs, is 0.617, the weight f 1152 of the domain, to which the word B belongs, is 2.25, and the weight y 1153 of the domain, to which the word C belongs, is 1.8. The weight of each domain may be referred to as a domain weight.

In addition, the processor 180 may correct the word-by-word probability 1120 based on the determined weights 1151, 1152 and 1153, thereby determining the corrected probability 1160. For example, the processor 180 may determine that the corrected probability of the word A is 37%, the corrected probability of the word B is 45%, and the corrected probability of the word C is 18% using the weights 1151, 1152 and 1153 in the domains, to which the words belong. Therefore, the word B having a highest probability may be determined as the word of the section 1111.

In addition, the processor 180 may convert the speech data 1110 into text again using the corrected probability 1160 and generate intent information corresponding to the newly converted text, thereby generating the alternative speech recognition result.

For example, assume that the text 1130 converted from the speech data 1110 is "The temperature of the whole country has fallen down a movie today" and a probability that the word of the section 1111 is a "movie" is 60%, a probability that the word of the section 1111 is a "below zero" is 20% and a probability that the word of the section 1111 is a "infant" is 10%. In this case, the processor 180 may determine "weather" as the dominant domain based on the named entities "whole country", "temperature", "movie" and the verb phrase "has fallen down" included in the text 1130. In addition, it may be determined that a probability that the word of the section 1111 is a "movie" is 37%, a probability that the word of the section 1111 is a "below zero" is 45% and a probability that the word of the section 1111 is a "infant" is 18%, based on the determined domain. Therefore, "below zero" may be determined as the word of the section 1111 and thus the text may be converted into new text "The temperature of the whole country has fallen down below zero today".

Figure 12:
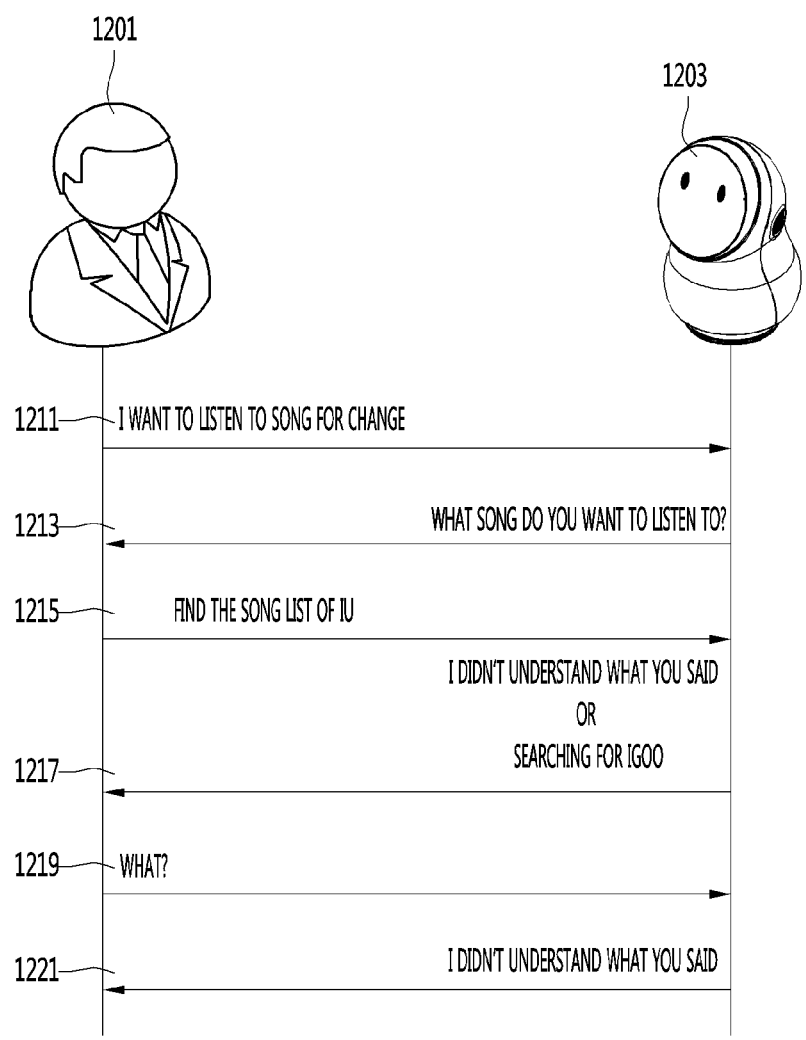
FIG. 12 is a view illustrating an embodiment of recognizing speech of a user according to conventional technology.

FIG. 12 is a view illustrating an embodiment of recognizing speech of a user according to conventional technology.

Referring to FIG. 12, when a user 1201 utters "I want to listen to a song for change" 1211, an artificial intelligence apparatus 1203 may provide a response "What song do you want to listen to?" 1213.

In addition, when it is assumed that the user 1201 utters "Find the song list of IU" 1215 but the artificial intelligence apparatus 1203 does not accurately recognize the word "IU", the artificial intelligence apparatus 1203 according to the conventional technology may provide a response corresponding to a situation in which speech recognition has failed, such as "I didn't understand what you said" or "Searching for IGOO" 1217.

When the user 1201 utters negative feedback such as "What?" 1219 in response thereto, the artificial intelligence apparatus 1203 according to the conventional technology may not find the meaning from the speech of the user and may provide a response corresponding to a situation in which speech recognition has failed, such as "I didn't understand what you said" 1221.

Figure 13:
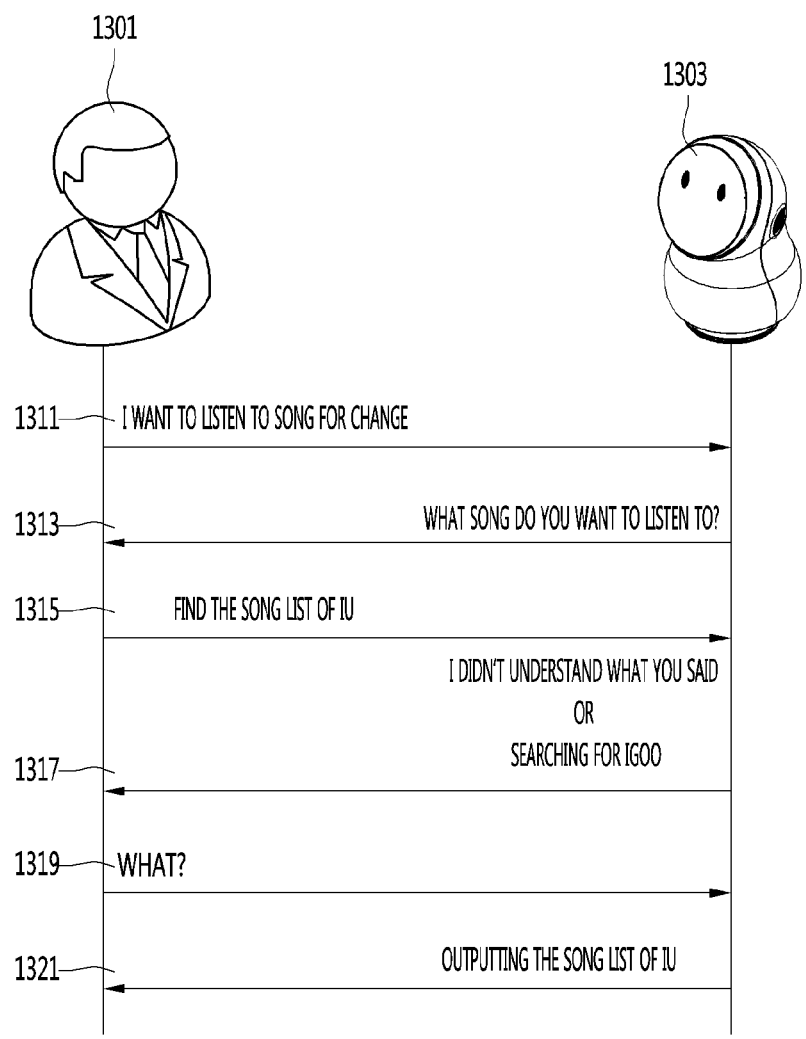
FIG. 13 is a view illustrating an embodiment of recognizing speech of a user according to an embodiment.

FIG. 13 is a view illustrating an embodiment of recognizing speech of a user according to an embodiment.

Referring to FIG. 13, when a user 1301 utters "I want to listen to a song for change" 1311, an artificial intelligence apparatus 1303 may provide a response "What song do you want to listen to" 1313.

In addition, when it is assumed that the user 1201 utters "Find the song list of IU" 1315 but the artificial intelligence apparatus 1303 does not accurately recognize the word "IU", the artificial intelligence apparatus 1303 according to the embodiment may provide a response corresponding to a situation in which speech recognition has failed, such as "I didn't understand what you said" or "Searching for IGOO" 1317.

When the user 1201 utters negative feedback such as "What?" 1319 in response thereto, the artificial intelligence apparatus 1303 may determine that the existing speech recognition result was incorrect, generate an alternative speech recognition result, and provide a response "Outputting the song list of IU" 1321 in response thereto.

According to various embodiments of the present disclosure, since negative feedback of a user is detected when speech of a user is recognized, it is possible to determine that the speech has been incorrectly recognized. When an alternative recognition result is generated without additional utterance of the user, it is possible to efficiently reduce the number of times of re-utterance of the user and to increase user's satisfaction with the speech recognition function.

According to an embodiment, the above-described method may be implemented as a processor-readable code in a medium where a program is recorded. Examples of a processor-readable medium may include hard disk drive (HDD), solid state drive (SSD), silicon disk drive (SDD), read-only memory (ROM), random access memory (RAM), CD-ROM, a magnetic tape, a floppy disk, and an optical data storage device.

What is claimed is:

1. An artificial intelligence apparatus for recognizing speech of a user, the artificial intelligence apparatus comprising:
   a microphone; and
   a processor configured to:
   acquire, via the microphone, first speech data including speech of the user,
   generate a first speech recognition result corresponding to the first speech data,
   perform control corresponding to the generated first speech recognition result,
   generate an alternative speech recognition result corresponding to the first speech data if negative feedback is acquired from the user,
   perform control corresponding to the generated alternative speech recognition result,
   calculate word-by-word reliability corresponding to each section in the first speech data,
   convert the first speech data into first text by selecting words having highest reliability for each section, and
   generate the first speech recognition result based on the first text.

2. The artificial intelligence apparatus of claim 1, wherein the processor is configured to:
   correct the word-by-word reliability corresponding to each section in the first speech data,
   convert the first speech data into second text by selecting words having highest corrected reliability for each section, and
   generate the alternative speech recognition result based on the second text.

3. The artificial intelligence apparatus of claim 2, wherein the processor is configured to:
   extract a named entity and a verb phrase from the first text,
   determine respective domains of the extracted named entity and the extracted verb phrase, and
   correct the word-by-word reliability based on the determined domains.

4. The artificial intelligence apparatus of claim 3, wherein the processor is configured to:
   determine a domain weight for each of the domains, and
   correct the word-by-word reliability based on the domain weight.

5. The artificial intelligence apparatus of claim 4, wherein the processor is configured to:
   determine a dominant domain based on the determined domains,
   calculate a distance from each of the determined domain to the dominant domain, and
   determine a domain weight as decreasing as the calculated distance of a domain increases.

6. The artificial intelligence apparatus of claim 1, further comprising a camera,
   wherein the processor is configured to:
   acquire image data via the camera,
   generate an image recognition result corresponding to the image data, and determine whether negative feedback is included in the image recognition result.

7. The artificial intelligence apparatus of claim 6, the processor is configured to generate the image recognition result by recognizing an expression or a gesture of the user from the image data, and
wherein the negative feedback includes a frowning expression or a hand waving gesture.

8. The artificial intelligence apparatus of claim 1, wherein the processor is configured to:
acquire second speech data via the microphone,
generate a second speech recognition result corresponding to the second speech data, and
determine whether negative feedback is included in the second speech recognition result.

9. The artificial intelligence apparatus of claim 8, wherein the negative feedback includes negative evaluation of or negative reaction to control corresponding to the first speech recognition result.

10. A method of recognizing speech of a user, the method comprising:
acquiring, via a microphone, first speech data including speech of the user,
generating a first speech recognition result corresponding to the first speech data,
performing control corresponding to the generated first speech recognition result,
generating an alternative speech recognition result corresponding to the first speech data if negative feedback is acquired from the user, and
performing control corresponding to the generated alternative speech recognition result,
wherein the generating the first speech recognition result corresponding to the first speech data includes:
calculating word-by-word reliability corresponding to each section in the first speech data,
converting the first speech data into first text by selecting words having highest reliability for each section, and
generating the first speech recognition result based on the first text.

11. A non-transitory computer readable medium having recorded thereon a program for performing a method of recognizing speech of a user, the method comprising:
acquiring, via a microphone, first speech data including speech of the user,
generating a first speech recognition result corresponding to the first speech data,
performing control corresponding to the generated first speech recognition result,
generating an alternative speech recognition result corresponding to the first speech data if negative feedback is acquired from the user, and
performing control corresponding to the generated alternative speech recognition result,
wherein the generating the first speech recognition result corresponding to the first speech data includes:
calculating word-by-word reliability corresponding to each section in the first speech data,
converting the first speech data into first text by selecting words having highest reliability for each section, and
generating the first speech recognition result based on the first text.

\* \* \* \* \*